Patented May 23, 1933

1,910,641

UNITED STATES PATENT OFFICE

BENNO SELIGER, OF CHICAGO, ILLINOIS

PACKING MATERIAL

No Drawing.   Application filed August 6, 1930.  Serial No. 473,520.

This invention relates to improvements in packing material, and refers specifically to the provision of a packing material which may be adaptable for use as a gasket, flange packing, fitting packing, valve stem packing, and in general any place where a packing may be utilized to render a juncture fluid-tight.

In the substances heretofore used for purposes of packing, particularly those substances containing asbestos as one of the ingredients thereof, the packing deteriorates as such when subjected to temperatures ranging from approximately 600° to 700° F. The substance becomes exceedingly hard and loses those qualities which make it desirable for packing purposes. In addition, such packings harden merely from standing during a period of time and hence necessitate frequent replacement.

When making gaskets from the usual material heretofore used for the construction of the same, it has been the practice to cut the gasket in the shape desired from said material, which usually comes in sheets. In this manner it can be readily seen that there is a great amount of waste left over after the gasket has been cut.

Accordingly, my invention is directed to the elimination of these hereinbefore mentioned disadvantageous features inherent in packing heretofore used. For instance, the packing which comprises the embodiment of my invention can successfully withstand temperatures far in excess of the maximum critical temperatures of the prior art packings, it being possible to use my packing where temperatures are involved of the nature of 800° to 900° F., more or less. My packing will not deteriorate or harden from standing for substantially an indefinite period of time, and can be removed after once being used and may be used over again. Further, gaskets may be constructed from my packing which can be conveniently made in any desirable shape, and inasmuch as such gaskets can be molded or pressed and are not cut from a sheet, no waste is involved.

The packing which comprises my invention may be used to seal such fluids as, for example, steam, superheated or saturated, hot or cold water, air, illuminating gas, liquid ammonia, gasoline, benzine, naphtha, tar, paraffin distillate, hydrocarbon oils in general, either hot or cold, and ammonia gas.

My invention broadly comprises a mixture of suitable proportions of calcium carbonate, a lubricating material solid at comparatively high temperatures, and a binder. The calcium carbonate preferably used takes the form of relatively pure calcium carbonate, for instance, whiting has been found to be desirable. The solid lubricating material may take the form of a material having lubricating properties at temperatures ranging from comparatively low temperatures to relatively high temperatures, for example, 800° to 900° F. Graphite, talc, soapstone and/or the like may be advantageously used. If desired, a plurality of solid lubricating substances may be used, one, for instance, having ideal lubricating properties at relatively low and intermediate temperatures, for example, from below zero to 400° or 500° F., more or less, and another having ideal lubricating properties at relatively higher temperatures, for example, from 500° to 900° F., more or less. The binder utilized may take the form of a non-drying oil or glycerine.

A desirable mixture may comprise 100 parts of calcium carbonate, 30 to 40 parts graphite, an ideal solid lubricant at relatively low temperatures, 2 to 8 parts talc, an ideal solid lubricant at relatively high temperatures, and 15 to 25 parts non-drying oil or glycerine. If glycerine is used, I have found it desirable to increase the proportion of talc, or high temperature lubricant to approximately 20 to 30 parts.

In sealing such fluids as, for example, superheated or saturated steam, hot or cold water, air, illuminating gas, liquid ammonia or the like, I have found that a non-drying oil may be advantageously used as a binder, preferably a non-drying vegetable oil. If it is desired to seal such fluids as, for instance, gasoline, naphtha, tar, paraffin distillate, or in general hot or cold hydrocarbon oils and ammonia gas, I have found that a binder such as glycerine, for example, may prove desirable.

As a specific example of a suitable mixture of the first class, wherein a non-drying oil may be used as a binder—to 100 parts of substantially pure calcium carbonate may be added approximately 30 to 40 parts graphite, preferably about 35 parts, approximately 2 to 8 parts talc, preferably about 5 parts, and approximately 15 to 25 parts of non-drying oil, preferably about 20 parts of non-drying vegetable oil. Inasmuch as such fluids as steam, water, liquid ammonia and the like are immiscible with an oil as above specified the above ingredients mixed in a suitable manner will serve as a desirable packing for such fluids.

If it is desired to render junctures fluid-tight to such fluids as the hydrocarbons, ammonia gas or the like, a binder such as glycerine may supplant the non-drying oil. A suitable mixture of this class may comprise 100 parts substantially pure calcium carbonate, 30 to 40 and preferably 35 parts graphite, 20 to 30 and preferably 25 parts talc, and 15 to 25 and preferably 20 parts of glycerine.

It is to be understood that the above mentioned examples are merely given for purposes of illustration and are not intended to serve as a limitation upon my invention.

In mixing the various ingredients hereinbefore enumerated I have found it preferable to thoroughly mix the solid materials in a comminuted form and then add the binder, thoroughly mixing the mass until the same assumes a dark-gray appearance approaching black.

My packing may be molded in the form of a gasket for flange couplings, cylinder head gaskets or the like, in which case the packing may be made in a more solid state, that is, a lesser amount of binder may be used to a given proportion of solid material, whereas, if the packing is to be used as a mastic packing, that is, a packing which may be inserted under pressure to the juncture to be packed by means of a pressure gun or the like, the packing may assume a more plastic condition.

It is apparent that herein is provided a packing which is adaptable for use wherever packing may be used, and in addition possesses features which far surpass packing heretofore used. Further, the life of the packing is indefinite and when used prevents corrosion and oxidation at the packed juncture.

By the expression "relatively low temperatures" is meant temperatures ranging between below 0° F., to 500° F. By the expression "relatively high temperatures" as used in the specification and claims is meant temperatures ranging between 500° F., and approximately 900° F.

I claim as my invention:

1. A packing material comprising calcium carbonate, a solid lubricant at relatively low temperatures, a solid lubricant at relatively high temperatures, and a vegetable oil binder.

2. A packing material comprising the following ingredients: 100 parts calcium carbonate, 30 to 40 parts graphite, 2 to 8 parts talc and 15 to 25 parts of vegetable oil binder.

3. A packing material comprising the following ingredients: 100 parts calcium carbonate, 30 to 40 parts graphite, 20 to 30 parts talc and 15 to 25 parts of vegetable oil binder.

4. A packing material comprising the following ingredients: 100 parts calcium carbonate, 30 to 40, preferably 35, parts graphite, 2 to 8, preferably 5, parts talc, and 15 to 25, preferably 20, parts vegetable oil binder.

5. A packing material comprising the following ingredients: 100 parts calcium carbonate, 30 to 40, preferably 35, parts graphite, 20 to 30, preferably 25, parts talc, and 15 to 25, preferably 20, parts non-drying oil binder.

6. A packing material comprising 100 parts calcium carbonate, 35 parts graphite, 5 parts talc and 20 parts of a non-drying oil.

7. A packing material comprising 100 parts calcium carbonate, 35 parts graphite, 5 parts talc and 20 parts of a non-drying vegetable oil.

8. A packing material comprising 100 parts calcium carbonate, 35 parts graphite, 25 parts talc and 20 parts glycerine.

In testimony whereof I affix my signature.

BENNO SELIGER.